United States Patent
Ha et al.

(10) Patent No.: US 10,007,503 B2
(45) Date of Patent: Jun. 26, 2018

(54) METHOD AND APPARATUS FOR UPGRADING OPERATING SYSTEM OF ELECTRONIC DEVICE

(71) Applicant: Samsung Electronics Co., Ltd., Gyeonggi-do (KR)

(72) Inventors: Junho Ha, Gyeongsangbuk-do (KR); Alice Lee Chu, Saratoga, CA (US); Changwook Lee, Gyeonggi-do (KR); Xinwen Zhang, San Ramon, CA (US); Sungwhan Moon, Seoul (KR); Kukjin Bae, Gyeonggi-do (KR); Suyong Yang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 3 days.

(21) Appl. No.: 14/523,724

(22) Filed: Oct. 24, 2014

(65) Prior Publication Data

US 2015/0121357 A1    Apr. 30, 2015

(30) Foreign Application Priority Data

Oct. 24, 2013    (KR) ........................ 10-2013-0127447

(51) Int. Cl.
*G06F 9/44* (2018.01)
*G06F 8/65* (2018.01)
*G06F 21/62* (2013.01)

(52) U.S. Cl.
CPC ............ *G06F 8/65* (2013.01); *G06F 21/6218* (2013.01); *G06F 2221/2149* (2013.01)

(58) Field of Classification Search
CPC ...... G06F 9/45537; G06F 9/4406; G06F 9/46; G06F 21/57; G06F 21/556; G06F 12/1408; G06F 17/30091; G06F 9/44568; G06F 15/16; G06F 21/51; G06F 8/65; G06F 21/6218; H04L 63/105; H04L 9/3234
See application file for complete search history.

(56) References Cited

U.S. PATENT DOCUMENTS

| | | | |
|---|---|---|---|
| 5,590,266 A * | 12/1996 | Carson | G06F 21/556 715/741 |
| 6,516,394 B1 | 2/2003 | Don et al. | |
| 7,709,475 B2 | 6/2010 | He et al. | |
| 7,840,573 B2 | 11/2010 | Adams et al. | |
| 8,887,152 B1 * | 11/2014 | Chen | G06F 9/44568 717/174 |
| 8,938,473 B2 | 1/2015 | Das et al. | |

(Continued)

OTHER PUBLICATIONS

James Morris, "Filesystem Labeling in SELinux", Nov. 2004, pp. 1-8 <Filesys_Labelng_SELinux.pdf>.*

(Continued)

*Primary Examiner* — Tuan Vu

(57) ABSTRACT

An embodiment discloses an electronic device capable of performing an upgrade to an Operating System (OS) having enhanced security without deleting any user data in an electronic device having an OS and a method of operating the same. An embodiment discloses a method of upgrading an OS of an electronic device. The method includes detecting operating system upgrade initiation. The method also includes generating labeling information on each piece of user data; and relabeling the user data based on the labeling information.

21 Claims, 6 Drawing Sheets

(56) References Cited

U.S. PATENT DOCUMENTS

| | | | |
|---|---|---|---|
| 9,311,317 B1* | 4/2016 | Savant | G06F 17/30091 |
| 2006/0190983 A1 | 8/2006 | Adams et al. | |
| 2007/0107046 A1* | 5/2007 | Jaeger | G06F 21/57 |
| | | | 726/4 |
| 2007/0118900 A1* | 5/2007 | Focke | G06F 9/45537 |
| | | | 726/22 |
| 2007/0180509 A1* | 8/2007 | Swartz | G06F 9/4406 |
| | | | 726/9 |
| 2007/0245030 A1 | 10/2007 | Das et al. | |
| 2008/0027725 A1 | 1/2008 | Chu et al. | |
| 2009/0113130 A1 | 4/2009 | He et al. | |
| 2009/0166242 A1 | 7/2009 | Brown | |
| 2010/0049974 A1* | 2/2010 | Winjum | H04L 63/105 |
| | | | 713/166 |
| 2013/0018927 A1* | 1/2013 | Chang | G06F 12/1408 |
| | | | 707/805 |
| 2013/0111211 A1* | 5/2013 | Winslow | H04L 9/3234 |
| | | | 713/171 |
| 2013/0132528 A1* | 5/2013 | Enomoto | G06F 15/16 |
| | | | 709/219 |
| 2013/0333040 A1* | 12/2013 | Diehl | G06F 9/46 |
| | | | 726/24 |
| 2014/0325644 A1* | 10/2014 | Oberg | G06F 21/51 |
| | | | 726/22 |

OTHER PUBLICATIONS

Radhakrishnan et al, "Application Security Support in the Operating System Kernel", ASIACCS, Mar. 2006, p. 1-11 <Radha_SecuKernel.pdf>.*

International Search Report dated Jan. 21, 2015 in connection with International Application No. PCT/KR2014010080; 3 pages.

* cited by examiner

METHOD AND APPARATUS FOR UPGRADING OPERATING SYSTEM OF ELECTRONIC DEVICE

CROSS-REFERENCE TO RELATED APPLICATION(S) AND CLAIM OF PRIORITY

The present application is related to and claims priority from and the benefit under 35 U.S.C. § 119(a) of Korean Patent Application No. 10-2013-0127447, filed on Oct. 24, 2013, which is hereby incorporated by reference for all purposes as if fully set forth herein.

TECHNICAL FIELD

The present disclosure relates generally to a method of upgrading an Operating System (OS) of an electronic device having the OS and an apparatus for supporting the same.

BACKGROUND

An electronic device may operate based on at least one of various Operating Systems (OSs). The OS uses various security schemes to protect a system from security threats.

SUMMARY

A policy defined according to a secure Operating System (OS) of an electronic device describes access permissions of an entire system including a user, a program, a process, and a file and a device to be operated thereby, that is, all subjects and objects. Accordingly, the policy according to the secure OS may be supplied as a package together with related sources. Therefore, the electronic device installs the secure OS based on the package. The electronic device which is produced after the secure OS has been installed therein has no problem in using the applied policy according to the secure OS. However, in order to apply a new OS (secure OS) having enhanced security to an electronic device including an existing OS, all objects (for example, File System (FS), process, user data and the like) included in the electronic device should be labeled.

To address the above-discussed deficiencies, it is a primary object to provide an electronic device which can apply a secure OS without deleting any user data when applying the secure OS to the existing OS in the electronic device including the OS and a method of operating the same.

In an embodiment of this disclosure, the electronic device may include all devices using one or more of an Application Processor (AP), a Graphic Processing Unit (GPU), and a Central Processing Unit (CPU) such as an information and communication device, a multimedia device, a wearable device, and an application device thereof.

An embodiment of this disclosure may provide an electronic device which can support an upgrade of the OS without passing through a factory reset for initializing user data when the existing OS is upgraded to the OS having enhanced security in the electronic device including the OS and a method of operating the same.

An embodiment of this disclosure may provide an electronic device which can detect an interruption for labeling user data during the operation of the electronic device. The electronic device can also label the corresponding user data according to a security policy of the OS in response to the interruption and a method of operating the same.

An embodiment of this disclosure may provide an electronic device which can improve the user convenience and the usability of the electronic device by implementing an optimal environment for supporting security enhancement of the electronic device and a method of operating the same.

An embodiment of this disclosure may provide a method for upgrading an operating system of an electronic device. The method includes detecting operating system upgrade initiation. The method also includes generating labeling information on each piece of user data. The method also includes relabeling the user data based on the labeling information.

An embodiment of this disclosure may provide a method for operating an electronic device. The method includes storing labeling information for relabeling user data and transmitting a relabeling command of the user data to a kernel by a framework. The method also includes relabeling the user data according to the labeling information in response to the relabeling command by the kernel.

An embodiment of this disclosure may provide a computer-readable recording medium recording a program for performing the method by a processor.

An embodiment of this disclosure may provide a computer-readable recording medium recording a program for executing the operations of detecting operating system upgrade initiation. The program may also execute the operations of generating labeling information on each piece of user data. The program may also execute the operations of relabeling the user data based on the labeling information.

An embodiment of this disclosure may provide an electronic device. The electronic device includes a communication unit for receiving a package for upgrading an operating system. The electronic device also includes a storage unit for storing the package and storing labeling information for labeling user data. The electronic device also includes a controller for generating the labeling information when the operating system is upgraded and controlling the upgrade of the operating system by relabeling of the user data based on the labeling information.

An embodiment of this disclosure may provide an electronic device. The electronic device includes a display unit for displaying a screen related to progress of an upgrade of an operating system. The electronic device also includes a communication unit for performing communication of the electronic device and receiving a package for upgrading the operating system. The electronic device also includes a storage unit for storing one or more programs. The electronic device also includes one or more processors for executing the one or more programs to control the upgrade of the operating system of the electronic device, wherein the one or more programs include a program performing the processes of generating labeling information on each piece of user data when the upgrade to a secure operating according to the package is made, and relabeling the user data based on the labeling information.

In the above mentioned aspects, the features and technical merits according to embodiments of the present disclosure are slightly widely summarized in order that those skilled in the art may understand the present disclosure through the following detailed description of the present disclosure. Besides these features and advantages, the additional features and advantages of the present disclosure constituting the subject matter of the present disclosure described in the claims will be easily understood through the following detailed description of the present disclosure.

According to embodiments of the present disclosure, it is possible to contribute to improving the convenience of a user, and the usability, convenience, accessibility, and competitiveness of an electronic device since an installation of a secure OS having enhanced security can be supported in an electronic device having an existing OS.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
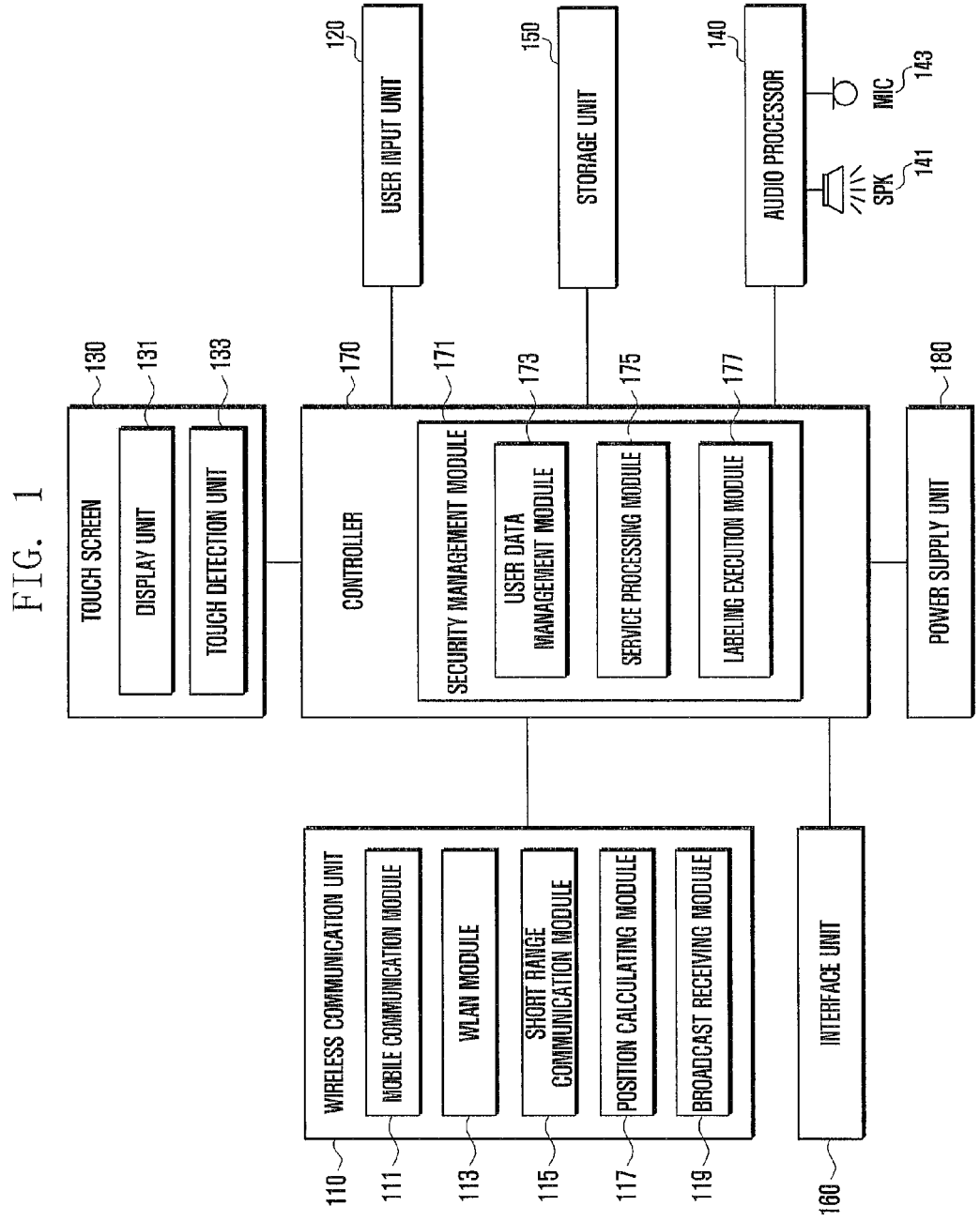
FIG. 1 illustrates a block diagram of configurations of an electronic device according to an embodiment of the present disclosure.

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system and method. Hereinafter, various embodiments of the present disclosure will be described with reference to the accompanying drawings. Although specific embodiments are illustrated in the drawings and related detailed descriptions are discussed in the present disclosure, the present disclosure may have various modifications and several embodiments. However, it shall be noted that it is not intended to limit the present disclosure to specific exemplary embodiments but intended to cover all the modifications, equivalents, or substitutions, which belong to the technical idea and technical scope of the present disclosure. In connection with descriptions of the drawings, similar components are designated by the same reference numeral. Further, a detailed description of a known function and configuration which may make the subject matter of the present disclosure unclear will be omitted. Hereinafter, it should be noted that only the descriptions will be provided that may help understanding the operations provided in association with the various embodiments of the present disclosure, and other descriptions will be omitted to avoid making the subject matter of the present disclosure rather unclear.

The expressions such as "include" and "may include" which may be used in the present disclosure denote the presence of the disclosed functions, operations, and constituent elements and do not limit one or more additional functions, operations, and constituent elements. Further, as used in embodiment of the present disclosure, the terms "include", "have" and their conjugates may be construed to denote a certain characteristic, number, block, operation, constituent element, component or a combination thereof, but may not be construed to exclude the existence of or a possibility of addition of one or more other characteristics, numbers, blocks, operations, constituent elements, components or combinations thereof.

Furthermore, in the present disclosure, the expression "and/or" includes any and all combinations of the associated listed words. For example, the expression "A and/or B" may include A, may include B, or may include both A and B.

The expressions such as "first", "second", or the like used in various embodiments of the present disclosure may modify various component elements in the various embodiments but may not limit corresponding component elements. For example, the above expressions do not limit the sequence and/or importance of the corresponding elements. The above expressions may be used merely for the purpose of distinguishing one element from the other elements. For example, a first user device and a second user device indicate different user devices although both of them are user devices. For example, a first constituent element may be termed a second constituent element, and likewise a second constituent element may also be termed a first constituent element without departing from the scope of various embodiments of the present disclosure.

When an element is referred to as being "coupled" or "connected" to any other element, it should be understood that not only the element may be directly coupled or connected to the other element, but also a third element may be interposed therebetween. Contrarily, when a element is referred to as being "directly coupled" or "directly connected" to any other element, it should be understood that no element is interposed therebetween. The terms as used in various embodiments of the present disclosure are merely for the purpose of describing particular embodiments and are not intended to limit the various embodiments of the present disclosure. As used herein, the singular forms are intended to include the plural forms as well, unless the context clearly indicates otherwise.

An electronic device according to embodiments of the present disclosure may be a device including a communication function. For example, the electronic devices may include at least one of smart phones, tablet personal computers (PCs), mobile phones, video phones, e-book readers, desktop PCs, laptop PCs, netbook computers, personal digital assistants (PDAs), portable multimedia players (PMPs), MP3 players, mobile medical devices, cameras, wearable devices {e.g., head-mounted-devices (HMDs) such as electronic glasses}, electronic clothes, electronic bracelets, electronic necklaces, electronic appcessories, electronic tattoos, or smart watches.

According to some embodiments, the electronic device may be a smart home appliance with a communication function. For example, the smart home appliance may include at least one of a television, a digital video disk (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic photo frame.

According to some embodiments, the electronic device may include at least one of various types of medical devices (for example, Magnetic Resonance Angiography (MRA), Magnetic Resonance Imaging (MRI), Computed Tomography (CT), a scanning machine, ultrasonic wave device and the like), a navigation device, a Global Positioning System (GPS) receiver, an Event Data Recorder (EDR), a Flight Data Recorder (FDR), a car infotainment device, ship electronic equipment (for example, navigation equipment for a ship, a gyro compass and the like), avionics, a security device, and an industrial or home robot.

According to some embodiments, the electronic device may include at least one of a part of furniture or a building/structure having a communication function, an electronic board, an electronic signature receiving device, a projector, and various kinds of measuring instruments (e.g., a water meter, an electric meter, a gas meter, a radio wave meter, and the like). The electronic device according to various embodiments of the present disclosure may be a combination of one or more of the aforementioned various devices. Further, it will be apparent to those skilled in the art that the electronic device according to various embodiments of the present disclosure is not limited to the aforementioned devices.

Proposed embodiments of the present disclosure provide a method and an apparatus for upgrading an installed existing Operating System (OS) to a secure OS having enhanced security in an electronic device operating based on the OS.

The secure OS according to an embodiment of the present disclosure may refer to an OS implementing a Mandatory Access Control (MAC) by using, for example, a Linux security module. For example, the secure OS may refer to the patch of the OS having the enhanced security.

Standard Linux security is a Discretionary Access Control (DAC) model. In the DAC model, a right to decide files and resources is given only to a user id of corresponding objects (for example, file, device, storage device, printer, memory, CPU and the like) and is assigned according to an ownership. Each user and a program executed by the user may have complete discretionary powers for objects assigned to the user. Accordingly, in this situation, even though some desired tasks are conducted by a given object through defective software executed by a malicious general or route user, there is no method to prevent it and to enforce a security policy over an entire system. Accordingly, an MAC model has been proposed. The MAC model provides elements which are not included in the DAC model. For example, the security policy may be prescribed to manage all processes or objects. When the secure OS is implemented through a kernel, all processes or objects may be controlled and the determination may be made based on all available security-related information, not by merely authenticated user identities.

For example, under the secure OS, the MAC may provide granular permissions to all subjects (for example, user, program, process and the like) and all objects (for example, file, device and the like). A right for use may be safely assigned only to used functions except for unnecessary parts in application programs. In order to implement the secure OS, a Role-Based Access Control (RBAC) that provides an abstracted user-level control based on Type Enforcement (TE) may be used. The TE may use a table (matrix) to process an access control. Since a subject has a domain and an object has a type, an interaction therebetween may be defined through alternate reference in a matrix. This enables the electronic device to extremely perform a local control for all actors.

Objects of the secure OS in the electronic device are to prevent right acquisition by an application, prevent data leakage by an application, prevent direct access of a security module, maintain application and data integrity, and pursue gains of consumers, business operators, and information. Accordingly, it is possible to prevent root right acquisition by the secure OS, and to preserve important parts (for example, important information regions such as bootloader, kernel, user and the like) included in the system even though the root right is acquired.

According to the secure OS, a security policy is newly defined. In the secure OS, the security policy may describe access permissions of an entire system including a user, a program, a process, and a file and a device to be operated thereby, that is, all subjects and objects. The security policy may be supplied as a package together with related sources. Accordingly, the electronic device may install the secure OS based on the package.

In order to apply the security OS to the electronic device including the existing OS, all objects (for example, File System (FS), process, user data and the like) included in the electronic device may be labeled. An example of labeling an object is shown in Table 1 below.

TABLE 1

| /data/drm(/.*)? | u: object_r: drm_data_file : s0 |
|---|---|

According to the examples of Table 1 above, all files and directories within "/data/drm" may be labeled with "drm_data_file".

For example, when it is assumed that there is application ABC and there is a policy of labeling a directory (dir) of "/data/important" with "imp_dir" in file context and labeling application ABC with "my_app" in file "ABC.te" describing a Type Enforcement (TE) of application ABC, a policy file such as Table 2 below may be defined.

TABLE 2

| allow my_app imp_dir:dir create_dir_perms; |
|---|

When a policy of application ABC is specified as shown in an example of Table 2 above, application ABC indicates a subject operating with a domain of "my_app" and the domain of "my_app" is assigned a right to generate a directory of "/data/important/" labeled with "imp_dir". As described above, access to regions which are not allowed by the ".te" policy file may be all blocked.

In order to apply the secure OS to the existing OS pre-installed in the current electronic device, a user data region may pass through a factory reset. For example, the existing OS does not specify security attributes (particularly, type attributes) of security context according to the secure OS in context according to the corresponding policy. For example, as shown in Table 3 below, the security context of the existing OS does not describe "type attributes" but the security context of the secure OS describes "type attributes".

The security context of the secure OS may have all attributes associated with a file, a directory, a TCP socket and the like and may include identify, role, and domain (identity:role:domain) or identity, role, and type (identity:role:type). The domain corresponds to a part to determine what access is assigned to a subject and may indicate what the corresponding subject can do and a list of actions which the subject can take according to the type. The type attributes refer to security attributes given to the object and corresponds to a part to determine which subject can access the object. In general, the domain and the security attributes of the type may be expressed by "_t" at the last thereof like "sysadm_t".

TABLE 3

| Existing OS | Secure OS |
| --- | --- |
| user_u:system_r (identity:role) | user_u:system_r:unconfined_t (identity:role:type) |

Accordingly, in order to apply the corresponding policy, an installation by a security package should be performed through a factory reset process of the electronic device. When the secure OS according to the security package is installed in the electronic device without the factory reset process, a policy for existing user data, that is, access permissions for all subjects and objects are not described, such that all user data is not labeled. Accordingly, the user of the electronic device does not also have a right to access the user data and thus cannot use the user data itself. For example, when the user desires to execute the conventionally used application in the electronic device, an error message indicating that a permission right has not been set may be output and the use of the application may be blocked.

Accordingly, an embodiment of the present disclosure provides an electronic device which can apply a secure OS without deleting any data when applying the secure OS to an existing OS in the electronic device including the OS and a method of operating the same. Further, an embodiment of the present disclosure provides an electronic device which can re-label user data with no labeling information according to a security policy of the secure OS in the electronic device during an operation of the electronic device and a method of operating the same.

Hereinafter, configurations of the electronic device according to an embodiment of the present disclosure and an operation control method thereof will be described with reference to the accompanying drawings. The configurations of the electronic device according to the embodiment of the present disclosure and the operation control method thereof are not restricted by or limited to contents which will be described below and therefore, it should be noted that they may be applied to various embodiments based on the embodiments which will be described below.

FIG. 1 illustrates a block diagram of configurations of an electronic device according to an embodiment of the present disclosure.

Referring to FIG. 1, the electronic device according to the embodiment of the present disclosure may include a wireless communication unit 110, a user input unit 120, a touch screen 130, an audio processor 140, a storage unit 150, an interface unit 160, a controller 170, and a power supply unit 180. In the embodiment of the present disclosure, not all elements illustrated in FIG. 1 are indispensable and thus, the electronic device may be implemented with more or less elements than illustrated in FIG. 1. For example, when the electronic device according to the embodiment of the present disclosure supports a photography function, the electronic device may further include a camera module. Further, when the electronic device according to the embodiment of the present disclosure does not support a broadcast receiving and reproducing function, some modules (for example, a broadcast receiving module 119 of the wireless communication unit 110) may be omitted.

The wireless communication unit 110 may include one or more modules which enable wireless communication between the electronic device and a wireless communication system or between the electronic device and another electronic device. For example, the wireless communication unit 110 may include a mobile communication module 111, a Wireless Local Area Network (WLAN) module 113, a short range communication module 115, a position calculating module 117, and a broadcast receiving module 119.

The mobile communication module 111 may transmit/receive a wireless signal to/from at least one of a base station, an external terminal, and various servers (for example, an integration server, a provider server, a content server, an Internet server, a cloud server and the like) over a mobile communication network. The wireless signal may include a voice call signal, video call signal, or data in various forms according to the transmission and reception of text/multimedia messages. The mobile communication module 111 may receive a higher version OS (for example, secure OS for security enhancement) for upgrading the existing OS of the electronic device. According to an embodiment, the mobile communication module 111 may receive a higher version OS from a server connected to the electronic device through a network (for example, mobile communication network). The OS of the electronic device may be upgraded through a wireless transmission technique (for example, Over-The-Air (OTA) or Firmware OTA (FOTA)) by the mobile communication module 111 or a wired communication technique (for example, Universal Serial Bus (USB)-based connection).

The WLAN module 113 may be a module for forming wireless Internet access and a WLAN link with another electronic device. The WLAN module 113 may be installed inside or outside the electronic device. WLAN (Wi-Fi), Wireless broadband (Wibro), World Interoperability for Microwave Access (Wimax), High Speed Downlink Packet Access (HSDPA), or the like may be used as a wireless internet technology. The WLAN module 113 may transmit data input by the user through a messenger or receive data from the outside. The WLAN module 113 may receive a higher version OS (for example, secure OS for security enhancement) for upgrading the existing OS of the electronic device. According to an embodiment, the WLAN module 113 may receive a higher version OS from a server connected to the electronic device through a network (for example, wireless Internet network). Further, the WLAN module 113 may transmit or receive various pieces of data (for example, images, videos, music and the like) according to the selection by the user when the WLAN link with another electronic device is formed to/from another electronic device. The WLAN module 113 may remain in a turned-on status or may be turned on according to a user's configuration or input.

The short range communication module 115 may correspond to a module for performing short range communication. Bluetooth, Bluetooth Low Energy (BLE), Radio Frequency Identification (RFID), Infrared Data Association (IrDA), Ultra Wideband (UWB), ZigBee, Near Field Communication (NFC), or the like may be used as a short range communication technology. The short range communication module 115 may transmit or receive various pieces of data (for example, images, videos, music and the like) according to the selection by the user when short range communication with another electronic device is formed to/from another electronic device. The short range communication module 115 may be maintained in a turned-on status or may be turned on according to a user's configuration or input.

The position calculating module 117 is a module for obtaining a position of the electronic device, and may include a Global Position System (GPS) module as a representative example thereof. The position calculating module 115 may calculate three dimensional current position information according to a latitude, a longitude, and an altitude by calculating information on a distance away from three or more base stations and accurate time information and then applying trigonometry to the calculated information. Alternatively, the position calculating module 117 may calculate position information by continuously receiving position information of the electronic device from three or more satellites in real time. The position information of the electronic device may be obtained through various methods.

The broadcast receiving module 119 may receive a broadcast signal (for example, a TV broadcast signal, a radio broadcast signal, a data broadcast signal, and the like) and/or broadcast related information (for example, information associated with a broadcast channel, a broadcast program, or a broadcast service provider) from an external broadcast management server through a broadcast channel (for example, a satellite broadcast channel, a terrestrial broadcast channel, or the like).

The user input unit 120 may generate input data for controlling the operation of the electronic device in response to a user input. The user input unit 120 may include a key pad, a dome switch, a touch pad (resistive type/capacitive type), jog & shuttle, sensors (for example, a voice recognition sensor, a proximity sensor, an illuminance sensor, an acceleration sensor, a gyro sensor and the like) and the like. Further, the user input unit 120 may be implemented in the form of buttons on an outer surface of the electronic device or in the form of touch panel. In an embodiment of the present disclosure, the user input unit 120 may receive a user input for initiating an OS upgrading operation according to the embodiment of the present disclosure and generate an input signal according to the received user input. For example, the user input unit 120 may receive a user input for identifying and/or upgrading a current OS of the electronic device and generate an input signal according to the user input.

The touch screen 130 is an input/output means for simultaneously performing an input function and a display function, and may include a display unit 131 and a touch detection unit 133. The touch screen 130 may display various screens (for example, a messenger and a screen displayed by the messenger, a screen for an outgoing call, a game screen, a video reproduction screen, a gallery screen, an upgrading screen and the like) according to the operation of the electronic device through the display unit 131. When a touch event is input into the touch detection unit 133 by the user while a particular screen is displayed on the display unit 131, the touch screen 130 may transmit an input signal according to the touch event to the controller 170. Then, the controller 170 may distinguish the touch event and control an operation according to the touch event.

The display unit 131 may display (output) information processed by the electronic device. For example, when the electronic device is in a call mode, the display unit 131 may display a call related User Interface (UI) or Graphical User Interface (GUI). Further, when the electronic device is in a video call mode or a photographing mode, the display unit 131 may display a photographed or/and received image and a UI and GUI related to the operation of the corresponding mode. When the OS of the electronic device is upgraded, the display unit 131 may display a UI or a GUI related to the progress of the upgrade. For example, in the upgrade, the display unit 131 may display information on a currently installed OS, information on a secure OS according to a received security package, and various items (for example, menus, buttons and the like) for executing the upgrade and selecting an upgrading method. The display unit 131 may support display in a landscape or portrait mode depending on an orientation of the electronic device (or a direction in which the electronic device is placed) and a screen display conversion depending on an orientation change between the landscape and portrait modes.

The display unit 131 may include at least one of a Liquid Crystal Display (LCD), a Thin Film Transistor-LCD (TFT-LCD), a Light Emitting Diode (LED), an Organic LED (OLED), an Active Matrix OLED (AMOLED), a flexible display, a bended display, and a 3D display. Some of the displays may be implemented as transparent displays configured in a transparent or photo-transparent type.

The touch detection unit 133 may be placed on the display unit 131 and may detect a touch event (for example, tap, drag, sweep, flick, drag & drop, drawing, single-touch, multi-touch, gesture (for example, writing), hovering or the like) made by the user who touches a surface of the touch screen 130. When the touch detection unit detects the touch event by the user on the surface of the touch screen 130, the touch detection unit 133 may detect a coordinate where the touch event is generated, and may transmit the detected coordinate to the controller 170. That is, the touch detection unit 133 may detect a touch event generated by the user, generate a signal according to the detected touch event, and transmit the generated signal to the controller 170. The controller 170 may control the performance of a function corresponding to an area where the touch event is generated, by a signal transmitted from the touch detection unit 133.

The touch detection unit 133 may receive a user input for initiating an OS upgrading operation according to an embodiment of the present disclosure and generate an input signal according to the received user input. For example, the touch detection unit 133 may receive a user input for identifying and/or upgrading a current OS of the electronic device and generate an input signal according to the user input.

The touch detection unit 133 may be configured to convert a change in a pressure applied to a specific portion of the display unit 131 or a change in an electrostatic capacity generated at a specific portion of the display unit 131 into an electric input signal. The touch detection unit 133 may be configured to detect a touch pressure according to an applied touch method as well as a touched position and a touched area. When there is a touch input for the touch detection unit 133, a signal (signals) corresponding to the touch input may be transferred to a touch controller (not illustrated). The touch controller (not illustrated) may process the signal (signals), and then transmit corresponding data to the controller 170. Accordingly, the controller 170 may identify which area of the touch screen 130 is touched.

The audio processor 140 may transmit, to a speaker (SPK) 141, an audio signal input from the controller 170, and may perform a function of transferring an audio signal such as a voice input from a microphone (MIC) 143 to the controller 170. The audio processor 140 may convert voice/sound data into an audible sound to output the audible sound through the speaker 141 under the control of the controller 170, and may convert an audio signal such as a voice received from the microphone 143 into a digital signal to transfer the digital signal to the controller 170.

The speaker 141 may output audio data received from the wireless communication unit 110 or stored in the storage unit 150. The speaker 141 may output voice signals related to functions performed by the electronic device (for example, functions of executing a messenger, receiving conversation, transmitting conversation, displaying an image, covering an image, receiving a call connection, transmitting a call connection, photographing, reproducing a media content file, upgrading an OS and the like).

The microphone 143 may receive an external sound signal and process the received sound signal voice data. In an example of a phone-call mode, the processed audio data may be converted into a format that can be transmitted to a mobile communication base station and then may be output through the mobile communication module 111. Various noise removal algorithms for removing noise generated in a process of receiving an external sound signal may be implemented for the microphone 143.

The storage unit 150 may store one or more programs for processing and control of the controller 170 and perform a function of temporarily storing input/output data (for example, messenger data (for example, conversation data), contact information (for example, wired or wireless phone number), a message, contents (for example, audio data, video data, images)).

The one or more programs may include programs for performing an operation of generating labeling information on each piece of user data when a secure OS is upgraded according to a package and an operation of relabeling the user data based on the labeling information. Further, the one or more programs may include a program for performing an operation of acquiring plain text (non-encrypted data) (for example, SEINFO or key value) configured in the user data in response to the secure OS upgrade initiation, an operation of identifying the user data based on the plain text, and an operation of generating labeling information on the identified user data. In addition, the one or more programs may include programs for performing an operation of changing existing security context of the user data by adding security attributes (for example, type attributes) specified in a security policy according to the secure OS to the security context of the user data.

The storage unit 150 may store upgrade data (for example, package) received from the outside through the wireless communication 110 or the interface unit 160 to upgrade firmware/software of the electronic device. Further, the storage unit 150 may store labeling information for labeling the user data in a file form. In addition, the storage unit 150 may also store use frequency (for example, application use frequency, content use frequency or the like), importance, and priority according to the operation of functions of the electronic device. The storage unit 150 may store data related to various patterns of vibration data and sound data output in response to a touch input on the touch screen 130.

The storage unit 150 may continuously or temporarily store an OS of the electronic device, a program related to an input and display control operation using the touch screen 130, a program related to an OS upgrade control operation, and data generated by operations of the programs. Further, the storage unit 150 may store a platform of FIG. 2 described below.

The storage unit 150 may include at least one type of storage medium of a flash memory type memory, a hard disk type memory, a micro type memory, a card type memory (for example, a Secure Digital (SD) card, an eXtream Digital (XD) card, or the like), a Dynamic Random Access Memory (DRAM), a Static RAM (SRAM), a Read-Only Memory (ROM), a Programmable ROM (PROM), an Electrically Erasable PROM (EEPROM), a Magnetic RAM (MRAM), a magnetic disk, and an optical disk. The electronic device may also operate in relation to a web storage performing a storage function of the storage unit 150 on the Internet.

The interface unit 160 may serve as an interface between the electronic device and all external devices connected to the electronic device. The interface unit 160 may transfer data transmitted from or power supplied from an external device to respective elements within the electronic device, or may allow data within the electronic device to be transmitted to the external device. For example, the interface unit 160 may include a wired/wireless headset port, an external charger port, a wired/wireless data port, a memory card port, a port for connecting a device provided with an identification module, an audio input/output port, a video input/output port, an earphone port, and the like.

The controller 170 may control general operations of the electronic device. For example, the controller 170 may perform a control related to voice communication, data communication, video communication, and the like. In upgrading the existing OS, the controller 170 may process an operation related to a function of upgrading the existing operation system to a higher version OS (for example, secure OS) without deleting user data and may include an upgrade management module 175 that performs the operation. The upgrade management module 171 may include a user data management module 173, a service processing module 175, and a labeling execution module 177. The upgrade management module 175 may be stored or loaded in at least one of the storage unit 150 and the controller 170 or may be implemented as a separate element. Further, the controller 170 may be implemented by one or more processors that control the OS upgrade according to the present disclosure by executing one or more programs stored in the storage unit 150.

In an embodiment of the present disclosure, when the existing OS (for example, Android) installed in the electronic device is upgraded, if an automatic upgrading option is configured by the user, the controller 170 may control the upgrading by a method of relabeling user data based on a policy defined according to a secure OS. In the upgrade to the secure OS, the controller 170 may generate labeling information and control the upgrade of the secure operating information by relabeling user data based on the labeling information without deleting any user data.

Alternatively, when the existing OS installed in the electronic device is upgraded, if a manual upgrading option is configured by the user, the controller 170 may control the upgrading by a method of installing a new OS (hereinafter, referred to as a secure OS, for example, Security Enhanced (SE) OS) regardless of user data in a state such as factory reset or control the upgrade by a method of relabeling the user data based on a policy defined according to the secure OS. Such an upgrade method may be determined according to the selection by the user.

For example, when a security package for upgrading the security of the OS is received from a server, the controller 170 may determine the OS upgrade initiation based on the security package. When the controller 170 determines the upgrade initiation, the controller 170 may notify the user of the generation of an upgrade event. When the controller 170 determines the upgrade initiation, the controller 170 may output OS upgrade information through the display unit 131 and perform feedback of the upgrade event through a vibration and/or a sound. The upgrade information may include information on the existing OS (for example, an OS name, an OS version, a final upgrade data and the like) currently installed in the electronic device and information on the secure OS according to the security package (for example, OS name, an OS version and the like). Further, the controller 170 may provide a button for selecting whether to execute the upgrade, a button for selecting an upgrade execution method and the like together with the upgrade information. In addition, the controller 170 may process the OS upgrading operation according to the upgrade method selected by the user.

The controller 170 (for example, the user data management module 173) may manage user data installed/stored in the electronic device (for example, applications and the like) and a function performed by the user data. The controller 170 (for example, the user data management module 173) may extract plain text (non-encrypted data) (for example, SEINFO or key value) configured in a basic packaging unit (for example, a particular file format file (for example, an APK file in an Android platform) and manage the extracted plain text.

When upgrading an OS to apply the secure OS to the existing OS, the controller 170 (for example, the service processing module 175) may generate labeling information for relabeling the user data according to a security policy specified in the secure OS. The controller 170 (for example, the service processing module 175) may identify the user data based on the plain text and generate labeling information on each piece of user data. The labeling information may include type attributes of security context specified in the security policy according to the secure OS. The controller 170 (for example, the service processing module 175) may store labeling information generated to correspond to each piece of user data in the storage unit 150 in particular file form (for example, a file having an extension of .xml).

When the upgrade to the secure OS is made, the controller 170 (for example, the labeling execution module 177) may control the relabeling of the user data of the electronic device based on the labeling information. The controller 170 (for example, the labeling execution module 177) may re-label the security context of the user data such that the labeling information is contained in the security context of the user data. For example, the controller 170 (for example, the labeling execution module 177) may add type attributes specified in the security policy according to the secure OS to the security context of the user data.

The controller 170 according to an embodiment of the present disclosure may detect an interruption for relabeling the user data during the operation of the electronic device. For example, the controller 170 may detect user data which has not been relabeled according to the security policy of the OS during the operation of the electronic device. Alternatively, the controller 170 may check context of the user data which is changed (for example, newly installed or upgraded) during the operation of the electronic and determine whether the corresponding user data may be executed based on the security policy of the OS (whether the corresponding user data has labeling information according to the security policy). The controller 170 may control the relabeling of the user data according to the labeling information for the corresponding user data in response to the interruption.

The controller 170 according to an embodiment of the present disclosure may control various operations related to general functions of the electronic device as well as the above described functions. For example, when a specific application is executed, the controller 170 may control the operation and display of the application. Further, the controller 170 may receive input signals corresponding to various touch event inputs supported by a touch-based input interface (for example, the touch screen 130) and may control an operation of functions according to the received input signals. Moreover, the controller 170 may also control data transmission/reception based on wired communication or wireless communication.

The power supply unit 180 may receive external power and internal power, and may supply power used for an operation of the elements under the control of the controller 170.

Various embodiments of the present disclosure may be implemented in a recording medium, which can be read through a computer or a similar device, by using software, hardware, or a combination thereof. According to the hardware implementation, the embodiments of the present disclosure may be implemented using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro-processors, and electrical units for performing other functions.

The recording medium may include a computer-readable recording medium recording a program for performing an operation of monitoring the OS upgrade initiation by the secure OS, an operation of generating labeling information on each piece of user data, and an operation for relabeling user data based on the labeling information.

In some examples, embodiments described in the present specification may be implemented by the controller 170. Further, according to the software implementation, the embodiments such as procedures and functions described in the present specification may also be implemented as separate software modules. The software modules may perform one or more functions and operations described in the present specification.

Figure 2:
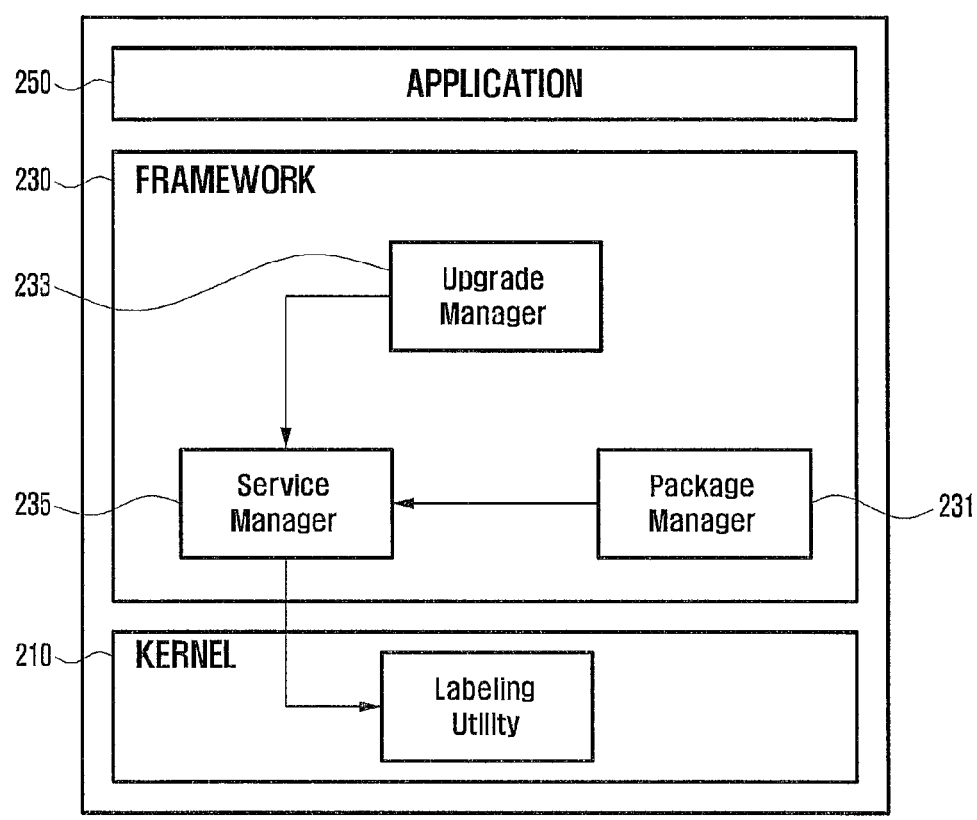
FIG. 2 illustrates a block diagram of an example of a platform structure of an electronic device that processes a function according to an embodiment of the present disclosure.

FIG. 2 illustrates a block diagram of an example of a platform structure of the electronic device that processes a function according to an embodiment of the present disclosure.

As illustrated in FIG. 2, the platform of the electronic device according to the embodiment of the present disclosure may include OS-based software.

Referring to FIG. 2, the electronic device according to the embodiment of the present disclosure may be designed to include a kernel 210, a framework 230, and an application 250.

The kernel 210 is a core of an OS, and may perform at least one of a hardware driver operation in an electronic device, security of hardware and processor in the electronic device, an efficient management of a system resource, a memory management, a providing of an interface for hardware through hardware abstraction, a multi process, service access management and the like. The kernel 210 may include a labeling utility 215 that processes an operation related to secure OS upgrade in an embodiment of the present disclosure.

The labeling utility 215 re-labels user data in response to a policy of the secure OS to be upgraded. For example, the labeling utility 215 may receive a labeling execution command of the user data from the service manager 235. The labeling utility 215 may re-label a policy type of user data based on a file generated by the service manager 235 in response to the labeling execution command. That is, the labeling utility 215 may re-label the user data through the labeling of adding the policy type to the security context for each piece of user data. The type refers to security attributes given to the object and corresponds to a part to determine which subject can access the object. The security attributes of the type may be expressed by "_t" at the last there like "sysadm_t".

For example, the labeling utility 215 may re-label context of the user data having the policy of the existing OS to change the context of the user data into context of user data having the policy of the secure OS as shown in Table 4 below.

TABLE 4

| user_u:system_r<br>(identity:role) | -> | user_u:system_r:unconfined_t<br>(identity:role:type) |
|---|---|---|

A hardware driver within the kernel 210 may include a display driver, an input device driver (for example, a keypad driver), a WiFi driver, a Bluetooth driver, a USB driver, an audio driver, a power manager, a binder driver, a camera driver, a memory driver (for example, a flash memory driver) and the like.

According to an embodiment of the present disclosure, when the existing OS is upgraded to the secure OS, all security contexts corresponding to user data are relabeled based on a policy according to the secure OS and thus labeling information of all security contexts of the user data may be ready to be used.

In an embodiment of the present disclosure, a policy type is added to the existing security context of the user data and an individual control for each role and each user is made according to the added policy type. Accordingly, the security based on the secure OS may be applied to the user data through the relabeling of the user data. For example, whether the access is allowed is determined by checking file permission through a conventional Linux security method (for example, DAC). When the access is allowed, a policy type of the security context is inspected through the MAC method and thus denial or permission of the corresponding access can be processed.

The framework 230 refers to an Application Program Interface (API) of the OS and may include a program which is the basis of applications within the application layer 250. The framework 230 is compatible with any application and may re-use, move, or exchange components. The framework 230 may include a supporting program, a program for connecting different software components and the like. In an embodiment of the present disclosure, the framework 230 may include a package manager 231 for processing the operation related to the upgrade of the secure OS, an upgrade manager 233, and a service manager 235.

The package manager 231 may manage what user data (for example, applications) is installed in the electronic device and which functions are performed by the user data.

In an embodiment of the present disclosure, the package manager 231 may analyze the user data (for example, applications and the like) installed/stored in the electronic device in the basic packaging unit (for example, a file of a particular file format (for example, APK file), extract plain text (for example, SEINFO or key value) from the basic packaging unit, and manage the extracted plain text. In an embodiment of the present disclosure, the package manager 231 may extract and manage the plain text when a periodic event or a particular event (for example, OS upgrade or application installation) is generated.

The upgrade manager 233 determines an upgrade of the OS according to a package which has been input from the wireless communication unit 110 (for example, the mobile communication module 111) or the interface unit 160 (for example, a USB port) and received through the kernel 210. The upgrade manager 233 may instruct the service manager 235 to initiate a labeling information securing operation when the upgrade by a user data relabeling method is made. A role of the upgrade manager 233 may be directly played by the service manager 235. Configurations of the upgrade manager 233 may be omitted.

When the OS upgrade initiation is detected, the service manager 235 may acquire plain text of the user data. The service manager 235 may load plain text extracted and managed by the package manager 233 from the service manager 235 to acquire the plain text. The service manager 235 may generate labeling information on the user data based on the acquired plain text and store the generated labeling information as a file. The labeling information may be generated based on a security policy (for example, including a type attribute part in security context) defined in the secure OS. In an embodiment of the present disclosure, the service manager 235 may be configured to process the operation of generating and managing plain text of the package manager 233. The service manager 235 may further perform operations of analyzing user data, extracting plain text of the user data, managing the extracted plain text and the like. Further, the service manager 235 may transmit a labeling execution command to the labeling utility 215 in response to the OS upgrade initiation.

In addition, although not illustrated, the framework 230 may include an activity manager, the package manager 231, a windows manager, a telephony manager, a content provider, a resource manager, a view system, a location manager, a notification manager, an eXtensible Messaging and Presence Protocol (XMPP) Service, and the like.

The application 250 may include various programs which can be executed and displayed in the electronic device. For example, the application 250 may include a User Interface (UI) application related to various menus and the like within the electronic device, an application which is downloaded and stored through an external device or a network and is freely installed or uninstalled by the user, and the like. Through such applications, an Internet call service by network access, a Video On Demand (VOD) service, a web album service, a Social Network Service (SNS), Location Based Service (LBS), a map service, a web search service, an application search service, a text/multimedia message service (SMS/MMS), a mail service, an address book service, a media reproduction service and the like may be executed. Further, the application 250 may perform various functions such as a schedule management function, a game function, and the like.

In addition to the above, the platform according to the present disclosure may further include middleware (not shown). The middleware (not shown) may be located between the kernel 210 and the application layer 250 and may serve as a medium enabling data exchange between different hardware or software. Accordingly, it is possible to provide a standardized interface, to support various environments, and to make mutual association with a task of another system.

The platform as described above can be used for not only the electronic device according to embodiments of the present disclosure but also various devices for general purpose. Further, the platform according to an embodiment of the present disclosure may be stored or loaded in at least one of the storage unit 150 and the controller 170 or a separate process (not shown).

Figure 3:
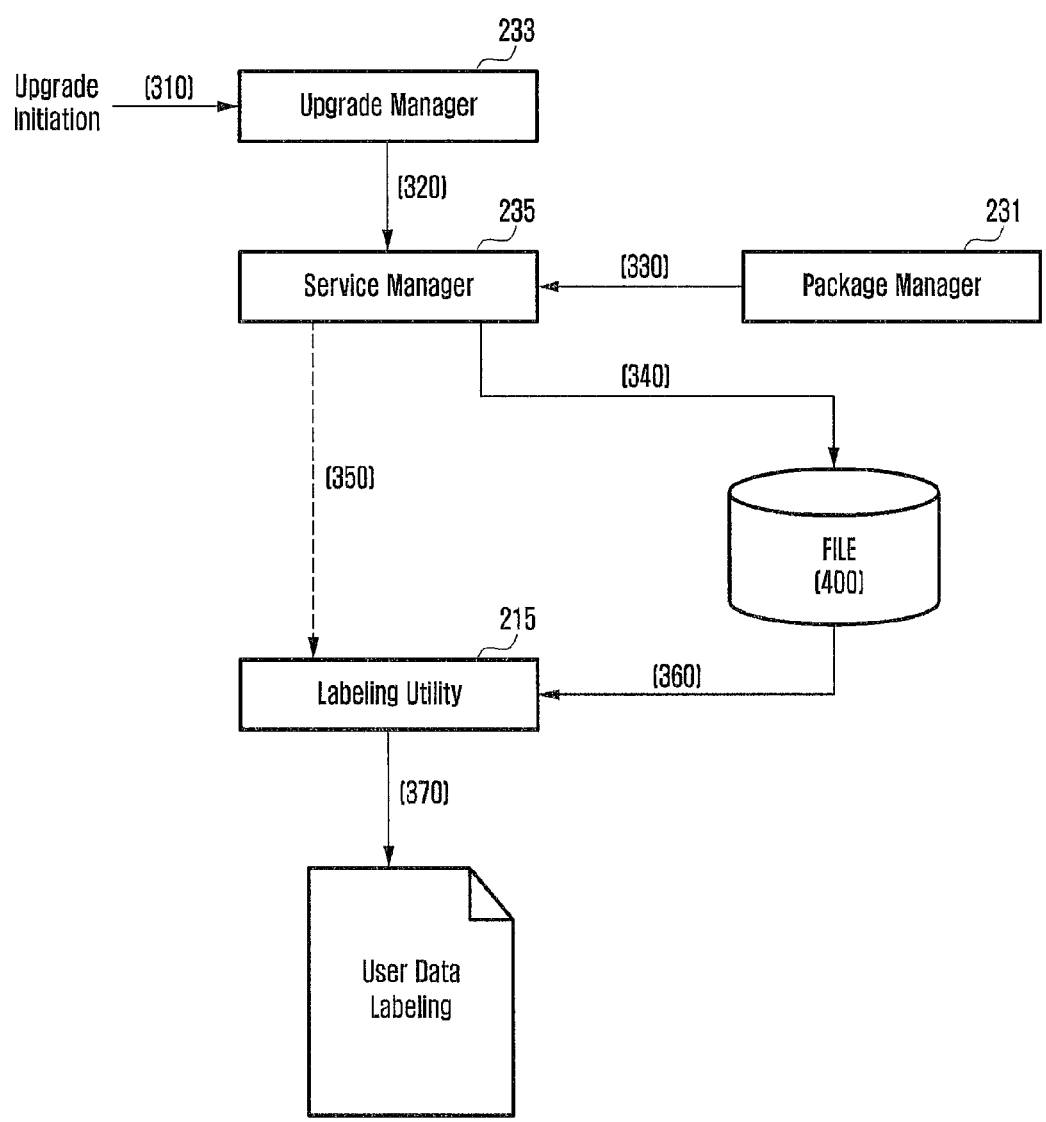
FIGS. 3 and 4 illustrate an operating system upgrading operation in an electronic device according to an embodiment of the present disclosure.

FIG. 3 illustrates an OS upgrading operation in the electronic device according to an embodiment of the present disclosure.

Referring to FIG. 3, when the upgrade manager 233 detects OS upgrade initiation as indicated by a reference numeral 310, the upgrade manager 233 may determine an OS upgrade method. When the upgrade is an upgrade excluding user data, the upgrade manager 233 may operate to upgrade by a factory reset process. When the upgrade is an upgrade that applies a new OS (for example, a secure OS) to the existing OS, the upgrade manage 233 may instruct the service manager 235 to perform a user data relabeling operation according to the upgrade of the OS as indicated by a reference numeral 320.

The service manager 235 may acquire plain text (for example, SEINFO or key value) from the package manager 231 in response to the instruction of the upgrade manager 233. The package manager 230 may extract plain text (for example, SEINFO or key value) from a file (for example, APK file) corresponding to user data and manage the extracted plain text.

The service manager 235 may generate labeling information used for relabeling security context of the user data based on the acquired plain text and store the generated labeling information as a file 400 as indicated by a reference numeral 340. For example, the service manager 235 may identify user data based on plain text and store context for each piece of user data including labeling information (particularly, a type attribute part in the security context) for labeling a new security policy according to a secure OS in the storage unit 150 as a particular file (for example, a file having an extension of .xml).

The service manager 235 may instruct the labeling utility 215 to label the user data together with the generation of the file in response to the instruction of the upgrade manager 233 as indicated by a reference numeral 350.

The labeling utility 215 may acquire a file in which labeling information is recorded from the storage unit 150 in response to the instruction to execute the labeling by the service manager 235 as indicated by a reference numeral 360. The labeling utility 215 may re-label security context of the user data based on the acquired file. For example, the labeling utility 215 may process a labeling operation of adding a type corresponding to a policy specified in the secure OS according to the labeling information included in the file to context of the user data. By relabeling the security context of all user data installed/stored in the electronic device, the labeling utility 215 may set the labeling information of the security context of the user data in a state which the labeling information is ready to be used.

Figure 4:
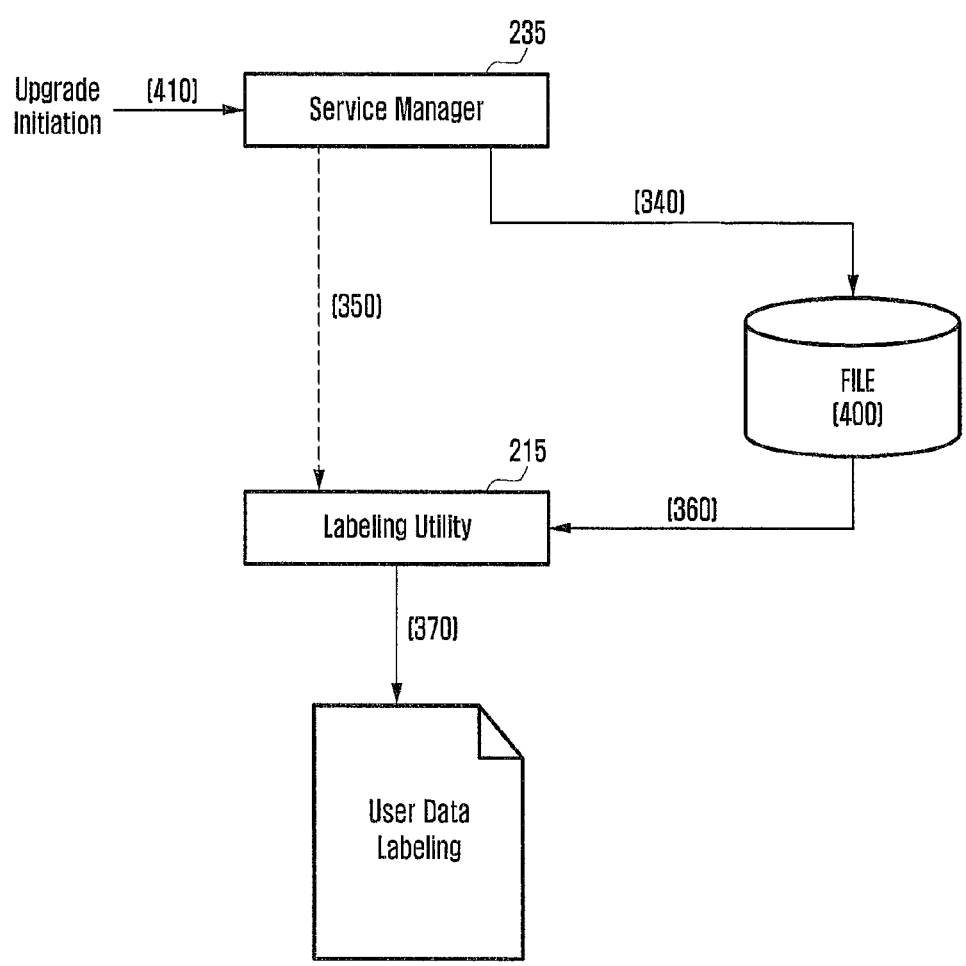

FIG. 4 illustrates an OS upgrading operation in the electronic device according to an embodiment of the present disclosure.

In FIG. 4, an example of a situation where the service manager 235 serves as both the package manager 231 and the upgrade manager 233 is illustrated. Accordingly, the description except for the operation of the service manager 235 described in FIG. 4 may correspond to the operation of FIG. 3 and the description thereof will be omitted.

Referring to FIG. 4, when the OS upgrade initiation is detected as indicated by a reference numeral 410, the service manager 235 may extract plain text (for example, SEINFO or key value) from a file (for example, APK file) corresponding to user data. The service manager 235 may analyze user data installed/stored in the electronic device and extract plain text of the user data. The plain text may be extracted in advance and managed by the service manager 235. The service manager 235 may instruct the labeling utility 215 to label the user data as indicated by a reference numeral 350 while generating labeling information used for relabeling security context of the user data based on the acquired plain text and storing the generated labeling information as a file 400 as indicated by a reference numeral 340.

As illustrated in FIG. 4, as the service manager 235 performs operations of the package manager 231 and the upgrade manager 233, configurations and operations of the package manager 231 and the upgrade manager 233 may be omitted in the security OS upgrading operation for supporting the security enhancement of the electronic device according to an embodiment of the present disclosure. For example, referring to FIGS. 3 and 4, it may be noted that operation 310 of FIG. 3 is replaced with operation 410 of FIG. 4, and the upgrade manager 233, operation 320, the package manager 231, and operation 330 are omitted.

Figure 5:
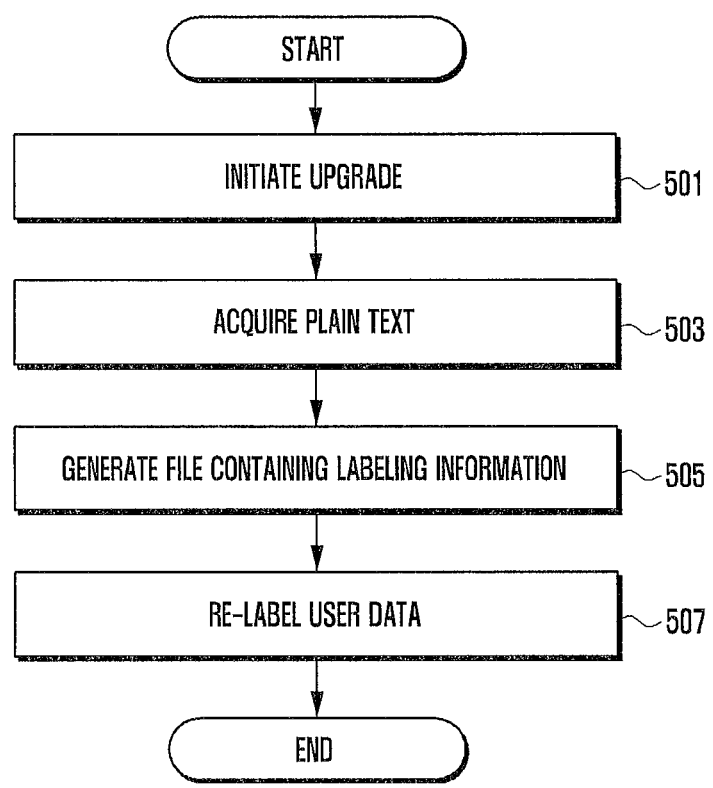
FIG. 5 illustrates a process of an operation method for upgrading an operating system in an electronic device according to an embodiment of the present disclosure.

FIG. 5 illustrates a process of an operation method for upgrading an OS in the electronic device according to an embodiment of the present disclosure.

Referring to FIG. 5, the controller 170 may detect OS upgrade initiation in block 501. For example, when a security package for upgrading the security of the existing OS is received through the wireless communication unit 110 or the interface unit 160 (for example, when the OS is upgraded by OTA), the controller 170 may determine it as the OS upgrade initiation.

The controller 170 may acquire plain text corresponding to user data in response to the OS upgrade initiation in block 503. For example, the controller 170 may identify user data installed/stored in the electronic device and extract plain text (for example, SEINFO or key value) from a file (for example, APK file) of the user data.

The controller 170 may generate labeling information of the user data based on the acquired plain text and generate one or more files in which the labeling information for each piece of user data is recorded in block 505. The labeling information may include type attributes of security context defined in the security policy according to the security package.

The controller 170 may re-label the context of the user data based on the file including the labeling information in block 507. For example, the controller 170 may change the existing security context of the user data into security context specifying a new security policy by adding the type attributes to the security context of the user data based on the labeling information of the file.

Figure 6:
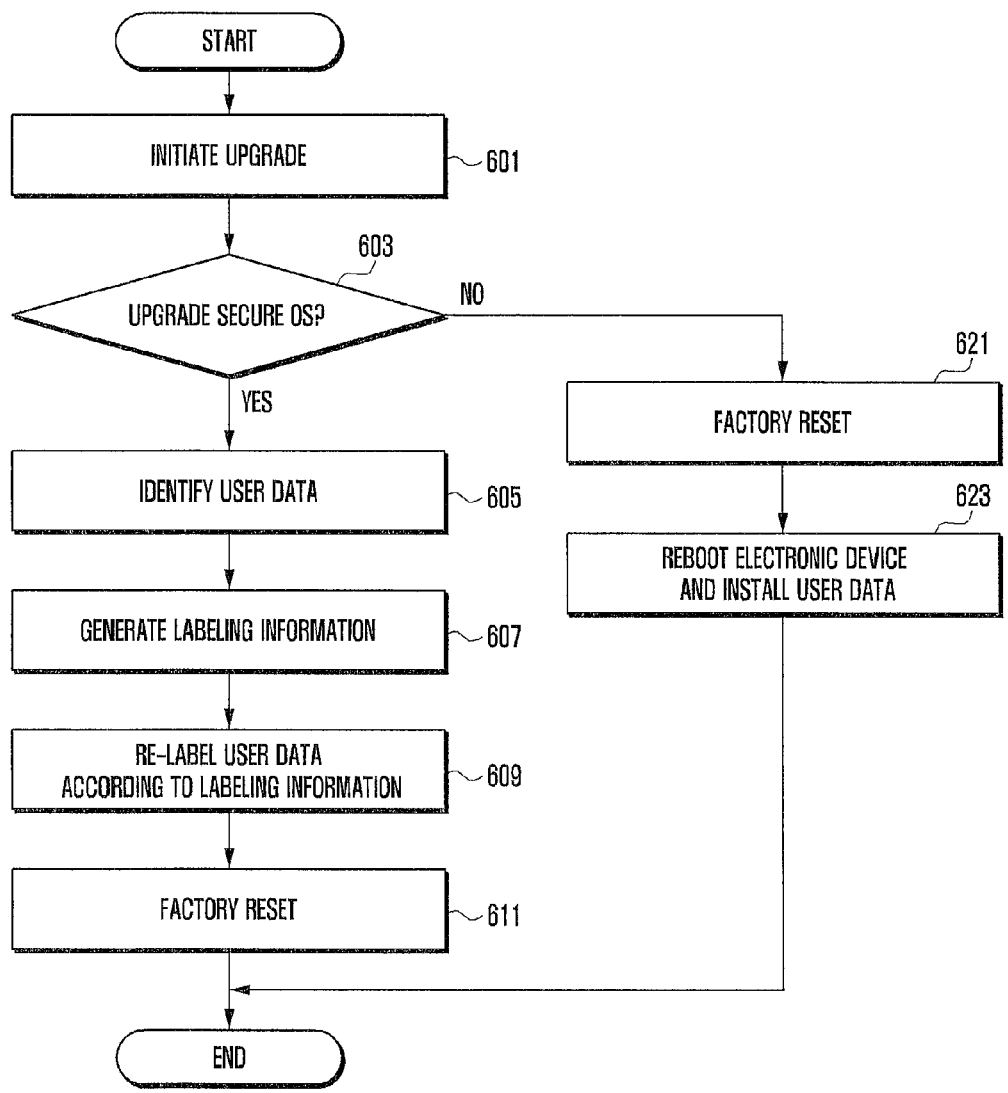
FIG. 6 illustrates a process of an operation method for upgrading an operating system in an electronic device according to an embodiment of the present disclosure.

FIG. 6 illustrates a process of an operation method for upgrading an OS in the electronic device according to an embodiment of the present disclosure.

Referring to FIG. 6, the controller 170 may detect OS upgrade initiation in block 601. For example, when a package for upgrading the OS is received from the outside, the controller 170 may determine it as the OS upgrade initiation.

When the controller 170 detects the OS upgrade initiation, the controller 170 may determine whether the OS upgrade is an upgrade for applying the secure OS for security enhancement of the existing OS or an installation of the secure OS. This may be selected according to a user input.

When the controller 170 determines the upgrade to the secure OS in block 603—Yes, the controller 170 may identify user data installed/stored in the electronic device in block 605 and generate labeling information for relabeling security context of the identified user data in block 607. The labeling information may include type attributes of security context specified in the security policy according to the secure OS.

The controller 170 may re-label the user data according to the generated labeling information in block 609. For example, the controller 170 may add type attributes according to the labeling information to the security context of the user data.

The controller 170 may control rebooting after the relabeling of the user data in block 611.

When the controller 170 determines the installation of the secure OS in block 603—No, the controller 170 may control factory reset for labeling user data installed in advance in the electronic device in block 621.

When the electronic device becomes in a factory reset state, the controller 170 may reboot the electronic device and install the user data in block 623. The security context specified in the security policy according to the package of the secure OS may be set in the installed user data.

As described above, in the embodiment of the present disclosure, when the OS is upgraded, labeling information of user data is generated and the user data is relabeled based on the labeling information. As a result, the electronic device may support the upgrade of the OS without deleting any user data. Further, as the user data is relabeled based on the security policy of the OS, all user data can be used in the upgraded OS.

According to an embodiment of the present disclosure, user data of the electronic device may be installed or upgraded according to the selection by the user. According to an embodiment of the present disclosure, the electronic device may detect an interruption for relabeling the user data during the operation of the electronic device. For example, the electronic device may detect user data which has not been relabeled according to the security policy of the OS during the operation of the electronic device. Alternatively, the electronic device may check context of the user data which is changed device (for example, newly installed or upgraded) during the operation of the electronic and determine whether the corresponding user data may be executed based on the security policy of the OS (whether the corresponding user data has labeling information according to the security policy).

When the interruption for relabeling the user data is detected during the operation of the electronic device, the electronic device may re-label the corresponding user data according to the security policy of the OS in response to the interruption. For example, when the electronic device determines that the corresponding user data cannot be executed, the electronic device may generate labeling information of the corresponding user data and change context of the corresponding user data, that is, re-label the user data based on the labeling information.

According to various embodiments of the present disclosure, the respective modules may be configured with software, firmware, hardware, or combinations thereof. Some or all modules may be configured within one entity, where the function of the corresponding module may be identically performed. Moreover, according to various embodiments of the present disclosure, respective operations may be executed sequentially, repeatedly, or in parallel. In addition, some operations may be omitted or may be executed while other operations are added thereto.

The various embodiments of the present disclosure as described above may be implemented in the form of a program instruction that can be performed through various computers, and may be recorded in a computer readable recording medium. The computer readable recording medium may include a program command, a data file, and a data structure independently or in combination. The program instruction recorded in the recording medium is specially designed and constructed for the present disclosure, but may be well known to and may be used by those skilled in the art of computer software.

The computer readable recording media may include a magnetic media such as a hard disc, a floppy disc, and a magnetic tape, an optical recording media such as a Compact Disc Read Only Memory (CD-ROM) and a Digital Versatile Disc (DVD), a magneto-optical media such as a floptical disk, and a hardware device, such as a Read Only Memory (ROM), a Random Access Memory (RAM), and a flash memory, specifically configured to store and execute program instructions. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of updating an electronic device, the method comprising:
   detecting, by a controller of the electronic device, an operating system upgrade initiation;
   determining, by the controller, whether the operating system upgrade initiation is an upgrade of a general operating system of the electronic device to a secure operating system or an installation of the secure operating system;
   responsive to the operating system upgrade initiation being the installation of the secure operating system, performing, by the controller, a factory reset for labeling user data; and
   responsive to the operating system upgrade initiation being the upgrade of the general operating system to the secure operation system, generating, by the controller, labeling information on each piece of the user data, wherein generating the labeling information comprises:
      extracting plain text from a file of the user data, wherein the file is a piece of user data;
      identifying the user data of the file based on the extracted plain text from the file;

generating the labeling information for the file based on the identified user data of the file; and storing the labeling information on each piece of user data in a file type; and relabeling the piece of the user data based on the labeling information.

2. The method of claim 1, wherein the user data exists on the electronic device prior to the operating system upgrade initiation.

3. The method of claim 1, wherein the labeling information comprises security attributes according to a security policy of the operating system.

4. The method of claim 3, wherein the security attributes comprise type attributes.

5. The method of claim 1, wherein the relabeling of the user data comprises changing security context of the user data based on a security policy of the operating system.

6. The method of claim 1, wherein the relabeling of the user data comprises adding type attributes corresponding to a security policy of the operating system to security context of the user data.

7. The method of claim 1, further comprising relabeling the user data during an operation of the electronic device.

8. A method of operating an electronic device, the method comprising:
determining, by a controller of the electronic device, whether an operating system upgrade initiation is an upgrade of a general operating system of the electronic device to a secure operating system or an installation of the secure operating system;
responsive to the operating system upgrade initiation being the installation of the secure operating system, performing, by the controller of the electronic device, a factory reset for labeling user data; and
responsive to the operating system upgrade initiation being the upgrade of the operating system to the secure operation system:
extracting, by the controller of the electronic device, plain text from a file of the user data, wherein the file is a piece of user data;
identifying, by the controller, the user data of the file based on the extracted plain text from the file;
generating, by the controller, labeling information for the file based on the identified user data of the file;
storing, by the controller, the labeling information for relabeling the user data and transmitting a relabeling command of the user data to a kernel by a framework; and
relabeling, by the controller, the user data according to the labeling information in response to the relabeling command by the kernel,
wherein storing the labeling information comprises storing the labeling information on each piece of user data in a file type.

9. The method of claim 8, wherein the storing of the labeling information is performed by a service manager, and further comprising storing the labeling information on the identified user data.

10. The method of claim 9, wherein the transmitting of the relabeling command comprises transmitting the relabeling command to a labeling utility of the kernel by the service manager.

11. The method of claim 9, wherein the extracting of the plain text is performed by the service manager and the service manager acquires the plain text managed by a package manager of the framework or extracts the plain text from the user data to acquire by the service manager.

12. The method of claim 8, wherein the relabeling of the user data is performed by a labeling utility and the labeling utility performs the relabeling by adding type attributes according to a security policy to security context of the user data.

13. The method of claim 8, further comprising:
detecting an interruption for relabeling the user data during an operation of the electronic device; and
relabeling the user data according to the labeling information.

14. An electronic device comprises:
a communication unit configured to receive a package for upgrading an operating system;
a storage unit configured to store the package and storing labeling information for labeling user data; and
a controller configured to:
determine whether the package is an upgrade of a general operation system of the electronic device to a secure operating system or an installation of the secure operating system;
responsive to an operating system upgrade initiation being the installation of the secure operating system, perform, by the controller, a factory reset for labeling the user data; and
responsive to the package being the upgrade of the operating system to the secure operation system, generate the labeling information when the operating system is upgraded and controlling the upgrade of the operating system by relabeling of the user data based on the labeling information, wherein the controller configured to generate the labeling information comprises the controller configured to:
extract plain text from a file of the user data, wherein the file is a piece of user data;
identify the user data of the file based on the extracted plain text from the file;
generate the labeling information for the file based on the identified user data of the file; and
store the labeling information generated for each piece of user data in a file type.

15. The electronic device of claim 14, wherein the controller is configured to control the upgrade of the operating system by the relabeling of the user data without deleting any user data.

16. The electronic device of claim 14, wherein the controller comprises:
a labeling execution module configured to relabel the user data based on the labeling information.

17. The electronic device of claim 16, wherein the labeling execution module is configured to add type attributes according to a security policy to security context of the user data.

18. The electronic device of claim 16, wherein the labeling information comprises type attributes according to a security policy.

19. The electronic device of claim 14, wherein the controller is configured to detect an interruption for relabeling the user data during an operation of the electronic device and controls the relabeling of the user data according to the labeling information.

20. An electronic device comprising:
a display unit configured to display a screen related to progress of an upgrade of an operating system;
a communication unit configured to perform communication of the electronic device and receiving a package for upgrading the operating system;

a storage unit configured to store one or more programs; and one or more processors configured to execute the one or more programs to control the upgrade of the operating system of the electronic device, wherein the one or more programs comprise a program performing the processes of:
- determining whether the package is an upgrade of a general operation system of the electronic device to a secure operating system or an installation of the secure operating system;
- responsive to an operating system upgrade initiation being the installation of the secure operating system, performing, by the one or more processors, a factory reset for labeling user data; and
- responsive to the package being the upgrade of the operating system to the secure operation system:
- generating labeling information on each piece of user data when the upgrade to a system operating according to the package is made;
- relabeling the user data based on the labeling information, wherein the program performing the process of generating the labeling information comprises extracting plain text from a file of the user data, wherein the file is a piece of user data;
- identifying the user data of the file based on the extracted plain text from the file;
- generating the labeling information for the file based on the identified user data of the file; and
- storing the labeling information on each piece of user data in a file type.

21. A non-transitory computer-readable medium embodying a computer comprising computer readable program code that when executed causes at least one processing device to perform operations of:
- detecting an operating system upgrade initiation;
- determining whether the operating system upgrade initiation is an upgrade of a general operating system of an electronic device to a secure operating system or an installation of the secure operating system;
- responsive to the operating system upgrade initiation being the installation of the secure operating system, performing a factory reset for labeling user data; and
- responsive to the operating system upgrade initiation being the upgrade of the operating system to the secure operation system, generating labeling information on each piece of user data, wherein generating the labeling information comprises:
- extracting plain text from a file of the user data, wherein the file is a piece of the user data;
- identifying the user data of the file based on the extracted plain text from the file;
- generating the labeling information for the file based on the identified user data of the file;
- storing the labeling information on each piece of user data in a file type; and
- relabeling the piece of the user data based on the labeling information.

* * * * *